United States Patent [19]

Zomotor et al.

[11] Patent Number: 5,341,297
[45] Date of Patent: Aug. 23, 1994

[54] APPARATUS AND METHOD FOR PREVENTING INSTABILITIES IN VEHICLE HANDLING

[75] Inventors: Adam Zomotor, Waiblingen; Walter Klinkner, Stuttgart; Erich Schindler, Unterweissach; Frank-Werner Mohn, Esslingen; Thomas Wohland, Stuttgart, all of Fed. Rep. of Germany

[73] Assignee: Mercedes-Benz AG, Fed. Rep. of Germany

[21] Appl. No.: 907,283

[22] Filed: Jul. 1, 1992

[30] Foreign Application Priority Data

Jul. 13, 1991 [DE] Fed. Rep. of Germany ....... 4123235

[51] Int. Cl.⁵ .............................. B60T 8/64; B62D 6/04
[52] U.S. Cl. ........................... 364/426.03; 364/426.01; 303/100; 303/103
[58] Field of Search ................ 364/426.03, 426.01, 364/424.05; 303/100, 111; 180/140; 280/91

[56] References Cited

U.S. PATENT DOCUMENTS

| | | | |
|---|---|---|---|
| 4,706,979 | 11/1987 | Kawabe et al. | 364/424 |
| 4,768,796 | 9/1988 | Tashiro et al. | 280/91 |
| 4,809,181 | 2/1989 | Ito et al. | 364/426.01 |
| 4,898,431 | 2/1990 | Karnopp et al. | 303/100 |
| 4,998,593 | 3/1991 | Karnopp et al. | 180/140 |
| 5,001,636 | 3/1991 | Shiraishi et al. | 364/424.05 |
| 5,019,982 | 5/1991 | Furukawa | 364/424.05 |
| 5,159,553 | 10/1992 | Karnopp et al. | 364/424.05 |
| 5,188,434 | 2/1993 | Ruf et al. | 303/111 |

FOREIGN PATENT DOCUMENTS

| | | |
|---|---|---|
| 3625392 | 8/1987 | Fed. Rep. of Germany . |
| 3731756 | 3/1989 | Fed. Rep. of Germany . |
| 3840456 | 6/1990 | Fed. Rep. of Germany . |

*Primary Examiner*—Thomas G. Black
*Assistant Examiner*—Tan Q. Nguyen
*Attorney, Agent, or Firm*—Evenson, McKeown, Edwards & Lenahan

[57] ABSTRACT

A method and apparatus prevents instabilities in vehicle handling by forming a desired value of the vehicle yaw angle rate $\mu_{des}$ from measured values (namely, vehicle speed, steering wheel angle), and forming the actual value of the vehicle yaw angle rate $\mu_{act}$ from at least one sensor signal. The difference between the desired value of the yaw angle rate $\mu_{des}$ and the actual value of the yaw angle rate $\mu_{act}$ is formed by subtracting the actual value of the yaw angle rate $\mu_{act}$ from the desired value of the yaw angle rate $\mu_{des}$. At least one output signal is generated and emitted by the computer unit, from this difference. The output signal represents the detected driving situation with respect to the yaw behavior of the vehicle, with the brake pressure of individual wheels of the vehicle being varied as a function of this output signal, and the output signal being generated in the computer unit as a function of a time derivative of the difference. The output signal contains information on whether the vehicle has understeering or oversteering handling. In the case of oversteering handling, the brake pressure is increased for the vehicle front wheel on the outside of the turn; in the case of understeering handling, the brake pressure is increased for the vehicle rear wheel on the inside of the turn.

19 Claims, 4 Drawing Sheets

APPARATUS AND METHOD FOR PREVENTING INSTABILITIES IN VEHICLE HANDLING

CROSS-REFERENCE TO RELATED APPLICATION

This application is related to applications Ser. No. 07/907,109 filed on even date herewith in the name of Adam Zomotor, et al. for METHOD FOR DETECTING DRIVING SITUATION WITH RESPECT TO VEHICLE YAW BEHAVIOR and application Ser. No. 07/912,371 filed on Jul. 13, 1992 in the name of Adam Zomotor, et al. for METHOD AND APPARATUS FOR PREVENTING VEHICLE HANDLING INSTABILITIES.

BACKGROUND AND SUMMARY OF THE INVENTION

The invention relates to an apparatus and method for preventing instabilities in the handling of a vehicle, and, more particularly, to such a method in which a desired value of the vehicle yaw angle rate $\mu_{des}$ is formed in a computer unit from measured values (namely, vehicle speed, steering wheel angle and the like), in which there is furthermore supplied to the computer unit at least one sensor signal from which the actual value of the vehicle yaw angle rate $\mu_{act}$ is formed with, the difference between the desired value of the yaw angle rate $\mu_{des}$ and the actual value of the yaw angle rate $\mu_{act}$ being formed in the computer unit, and the actual value of the yaw angle rate $\mu_{act}$ is subtracted from the desired value of the yaw angle rate $\mu_{des}$, and at least one output signal, is generated by the computer unit, from this difference, in which the output signal represents the detected driving situation with respect to the yaw behavior of the vehicle, and the brake slip of individual vehicle wheels is varied as a function of this output signal.

An instability preventing method is disclosed in DE 36 25 392 A1, according to which, the yaw angle rate $\mu_{act}$ of a vehicle is measured, for example by means of a fiber-optic gyro, in order to detect the driving situation with respect to the yaw behavior of the vehicle. An alternative way of determining the actual value of the yaw angle rate $\mu_{act}$ is by deriving the yaw angle rate $\mu_{act}$ by using at least one acceleration sensor which measures the radial acceleration of the vehicle. Furthermore, a desired value for the yaw angle rate $\mu_{des}$ can be derived from the measured vehicle speed in the longitudinal direction and the measured steering angle. In the latter, a critical driving situation is derived when the actual value of the yaw angle rate $\mu_{act}$ deviates from the desired value of the yaw angle rate $\mu_{act}$, i.e. when the actual behavior of the vehicle deviates from the desired behavior of the vehicle. This detected deviation of the actual behavior from the desired behavior of the vehicle is then used in order to minimize the deviation of the actual behavior of the vehicle from the desired behavior of the vehicle, in that an automatic intervention in the steering takes place and/or in that individual wheels of the vehicle are braked or accelerated such that the deviation is minimized.

A so-called linear single-track model of a vehicle is disclosed in other literature references (DE Book: Zomotor, Adam; Fahrwerktechnik [Running Gear Technology]: Fahrverhalten [Handling]; Publisher: Jörnsen Reimpell; Würzburg: Vogel, 1987; 1st edition; ISBN 3-8023-0774-7, in particular pages 99–127), by way of which a yaw angle rate $\mu_{act}$ of the vehicle, which under specific conditions is self-adjusting and is then used, on the basis of this single-track model, as the desired value of the yaw angle rate $\mu_{des}$ can be determined, for example, from measured values of the vehicle speed in the vehicle longitudinal direction and the steering wheel angle or the steering angles of the wheels corresponding thereto.

An object of the present invention is to provide a method and apparatus for preventing instabilities in vehicle handling as early as possible.

This object has been achieved according to the present invention by a method in which the time derivative of the difference between the actual and desired yaw angle rate is formed in the computer unit, with the output signal being generated in the computer unit as a function of this time derivative. The output signal contains information on whether the vehicle has oversteering or understeering handling. In the case of oversteering handling, the brake slip is increased for the vehicle front wheel on the outside of the turn, and in the case of understeering handling, the brake slip is increased for the vehicle rear wheel on the inside of the turn.

One of the advantages of the invention is that, as a result of the early detection of the driving situation with respect to the yaw behavior of the vehicle, unstable driving situations can be detected very early. It is thus possible to prevent the possible occurrence of unstable driving situations very early by a variation or increase in the brake pressure to change the slip $\sigma$ on individual wheels.

The vehicle longitudinal speed and the steering wheel angle or steering angle of the wheels are detected by suitable sensors. These sensor signals can be supplied to a computer unit in which a yaw angle rate $\mu_{des}$ of the vehicle desired by the vehicle driver can be determined from these variables (for example in accordance with the linear single-track model) as the desired value of the yaw angle rate $\mu_{des}$. The driving situation with respect to the yaw behavior is then detected in the computer unit, in that the actual value of the yaw angle rate $\mu_{act}$ is compared with the determined desired value $\mu_{des}$. In this situation, not only the magnitude of the difference between the actual value of the yaw angle rate $\mu_{act}$ and the desired value $\mu_{des}$ is considered, but also the mathematical sign of this difference and the time derivative of this difference. Particularly early detection of the possible occurrence of critical driving situations is possible, especially as a result of the consideration of the time derivative, so that the occurrence of critical driving situations can then be prevented by a suitable variation or increase in the brake pressure to vary the slip $\sigma$ on individual wheels.

In the case of oversteering handling in which the vehicle pulls itself into the turn, the front wheel on the outside of the turn is braked. The decrease in the lateral guiding force and the increase in the braking force in the circumferential direction result in a yaw moment of the vehicle which turns it back. The oversteering behavior of the vehicle is thereby decreased. If necessary, the stabilizing effect is reinforced by also additionally braking the wheel on the inside of the turn. This reinforcement occurs since, although the braking force supports the turning-in process in the circumferential direction, the decrease in the lateral guiding force of the wheel on the inside of the turn, however, not only compensates for the effect but, because of the lever arm of the forces acting, overcompensates and thus additionally stabilizes the vehicle.

In the case of understeering handling in which the vehicle is unwilling to yaw, i.e. it does not follow the steering input prescribed by the vehicle driver, the rear wheel on the inside of the turn is braked. The decrease in the lateral guiding force of this wheel and the increase in the braking force in the circumferential direction result in a yaw moment turning inwards. If required, the rear wheel on the outside of the turn can additionally be braked in this case. In a manner analogous to the abovementioned criterion for braking the front wheel on the inside of the turn in the case of oversteering handling, it is expedient if the product of the lateral force loss and the associated lever arm to the center of gravity is greater than the product of the braking force in the circumferential direction and the associated lever arm to the center of gravity.

As the actual value $\mu_{act}$ of the yaw rate approaches the desired value $\mu_{des}$, the braking forces are correspondingly decreased.

As an alternative to determining the desired value of the yaw angle rate $\mu_{des}$ by way of the linear single-track model, it is also possible to read this desired value of the yaw angle rate $\mu_{des}$ from a performance graph which is measured once.

BRIEF DESCRIPTION OF THE DRAWINGS

These and other objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
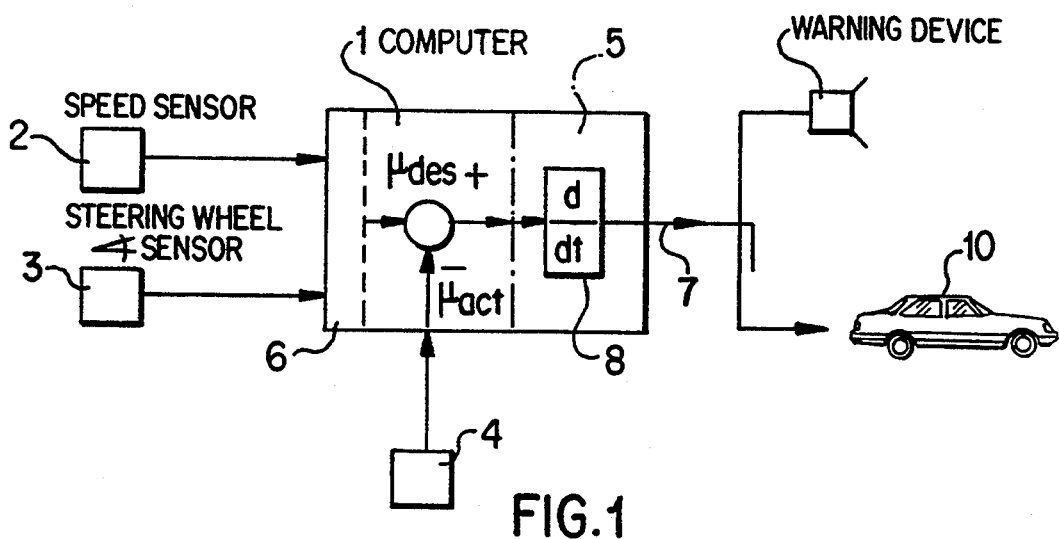
FIG. 1 is a schematic diagram of the sensors and the computer unit used in the present invention.

As can be seen from FIG. 1, the signal of a sensor 2, which signal represents the vehicle speed, is supplied to a computer unit 1. The sensor 2 may, for example, be a speed sensor, as is used in the case of known anti-lock braking systems (ABS). It is likewise possible for the sensor 2 to correspond to a plurality of speed sensors of different wheels, whose signals are averaged. A signal which represents the steering wheel angle is supplied to the computer unit 1 by a sensor 3. This sensor 3 may thus directly be a steering wheel angle sensor. Likewise, this sensor 3 may also be a sensor which detects the steering angle of one of the wheels of the vehicle 10 or a mean value of the steering angles of the vehicle wheels. The signal from at least one further sensor 4 is furthermore supplied to the computer unit 1, by way of which signal the actual value of the yaw angle rate $\mu_{act}$ can be formed in the computer unit 1. In this embodiment, the sensor 4 may, for example, measure the yaw angle rate $\mu_{act}$ directly.

A desired value of the yaw angle rate $\mu_{des}$ is determined in the computer unit 1 from the signals of the sensors 2 and 3, in the part 6 of the computer unit 1, for example by the aforementioned linear single-track model. This desired value of the yaw angle rate $\mu_{des}$ is compared with the actual value of the yaw angle rate $\mu_{act}$ formed in order that a difference is formed between the desired value and the actual value. The driving situation with respect to the yaw behavior of the vehicle 10 is then detected in the part 5 of the computer unit, using the time derivative 8 of the difference, and an output signal 7 is generated which represents the detected driving situation.

Figure 2:
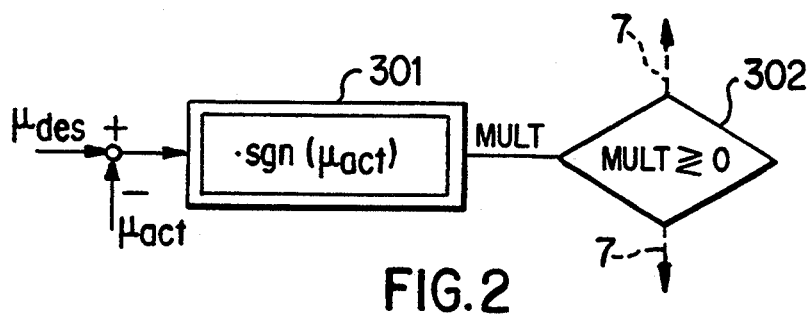
FIG. 2 is a schematic of the first part of the sequence diagram according to which the driving situation is detected in accordance with the present invention.

As can be seen from FIG. 2, the driving situation can also be detected in the computer unit 1 in that the difference between the actual value of the yaw angle rate $\mu_{act}$ and the desired value $\mu_{des}$ is evaluated in order to determine whether the handling is understeering or oversteering. To this end, the difference is formed, in that the actual value of the yaw angle rate $\mu_{act}$ is subtracted from the desired value of the yaw angle rate $\mu_{des}$. This difference is multiplied in the computer unit 1 by the mathematical sign of the actual value of the yaw angle rate $\mu_{act}$ step (301), from which a result MULT is produced. Understeering or oversteering handling can be derived by way of this result MULT step (302). If this variable MULT is positive, the magnitude of the desired value of the yaw angle rate $\mu_{des}$ is greater than the magnitude of the actual value of the yaw angle rate $\mu_{act}$, with the mathematical signs of the desired value $\mu_{des}$ and of the actual value $\mu_{act}$, however, being the same. In this situation, the vehicle 10 slips via the front axle. This behavior of being unwilling to yaw is termed understeering. If the variable MULT is negative, the actual value of the yaw angle rate $\mu_{act}$ is greater than the desired angle $\mu_{des}$ or the actual value of the yaw angle rate $\mu_{act}$ and the desired value $\mu_{des}$ have different mathematical signs. This behavior, in which the vehicle 10 has a greater yaw angle rate $\mu_{act}$ than the vehicle driver expects, is termed oversteering. In this case, an output signal 7 is formed, for example, in that the variable MULT must be considered in addition to the time derivative 8 in the generation of the output signal 7, and, for example, an additional output signal 7 is generated only as a function of the variable MULT.

Figure 3:
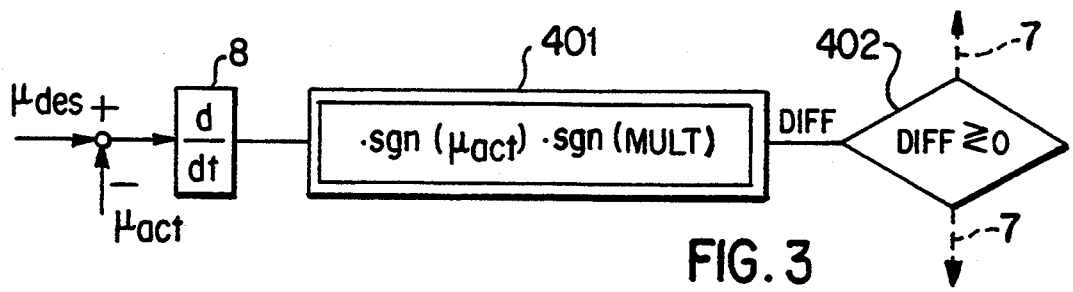
FIG. 3 is a schematic of the second part of the sequence diagram according to which the driving situation is detected in accordance with the present invention.

Furthermore, in accordance with the embodiment in FIG. 3, a variable DIFF is determined, in that the time derivative 8 of the difference is multiplied by the mathematical sign of the actual value of the yaw angle rate $\mu_{act}$ and by the mathematical sign of the variable MULT. This variable DIFF has a positive value both in the case of understeering as well as in the case of oversteering when an instability increase occurs, i.e. when the tendency to oversteering or understeering increases. The variable DIFF correspondingly assumes a negative value when the tendency to understeering or oversteering decreases. It is thus possible to detect an instability increase or instability decrease by an interrogation of the variable DIFF.

Figure 4:
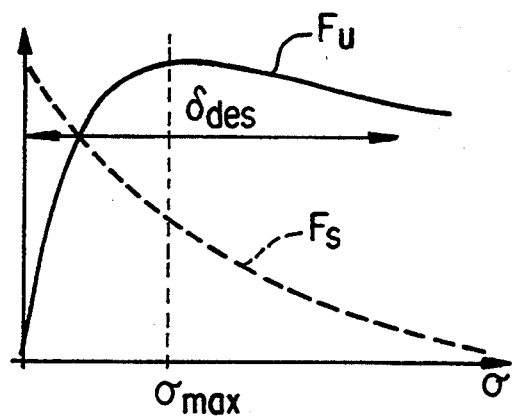
FIG. 4 is a graph of the force $F_u$ in the longitudinal direction of the wheel and of the lateral guiding force $F_s$ in relation to the region in which $\sigma_{des}$ is intended to be varied.

FIG. 4 shows the braking force $F_u$ which acts in the longitudinal direction of the wheel, superimposed on the brake slip $\sigma$. The lateral guiding force $F_s$ is likewise superimposed on the brake slip $\sigma$. The point $\sigma_{max}$ indicates the point at which the maximum force is transmitted in the longitudinal direction of the wheel. It can further be seen that, in the case of this maximum force point, the associated lateral guiding force $F_s$ has already decreased relatively severely. In general, it can be seen from FIG. 4 that as a result of an increase, or a variation in the sense of an increase, in the brake pressure, as a result of which an increase in the brake slip $\sigma$ is in turn achieved, an initially increasing braking force $F_u$ in the circumferential direction is achieved until the point $\sigma_{max}$ which then, however, has a slight drop or (in the case of relatively low coefficients of friction $\beta$—not shown here) remains constant. The lateral guiding force $F_s$ in this case decreases in accordance with the representation in FIG. 4 with increasing brake slip $\sigma$ strictly monotonically. Thus, an increase in the braking force always results in a decrease in the lateral guiding force $F_s$ and, until the slip $\sigma_{max}$ is reached, an increase in the braking force $F_u$ in the circumferential direction.

It is additionally shown that, in the case of the method according to the present invention, a variation in the desired value of the slip $\sigma_{des}$ should take place, as a result of which the lateral guiding force $F_s$ and the braking force $F_u$ acting in the longitudinal direction of the wheel are influenced.

Figure 5:
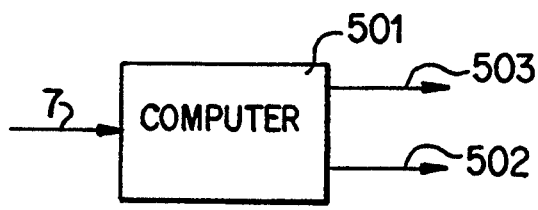
FIG. 5 is a schematic of a computer device via which the method according to the present invention can be carried out.

FIG. 5 shows a computer device 501, to which the output signal 7 of the computer unit 1 (FIG. 1) is supplied. The output signal represents the detected driving situation with respect to the yaw behavior of the vehicle. A desired value for the brake slip $\sigma_{des}$ of the individual wheels is determined in the computer device 501 as a function of the output signal 7, and the desired value is emitted as the output signal 502 of the computer device 501. A correspondingly varied brake pressure $p_B$ is then applied to achieve this brake slip $\sigma_{des}$. In this case, the desired value of the brake slip $\sigma_{des}$ is set. In order to achieve a time response which is as optimum as possible while preventing instabilities of the vehicle 10, the change of the yaw behavior of the vehicle with respect to time is advantageously taken into account in the variation of the desired slip $\sigma_{des}$. In this case, the change with respect to time is used to determine whether there is an instability increase or an instability decrease.

Figure 8:
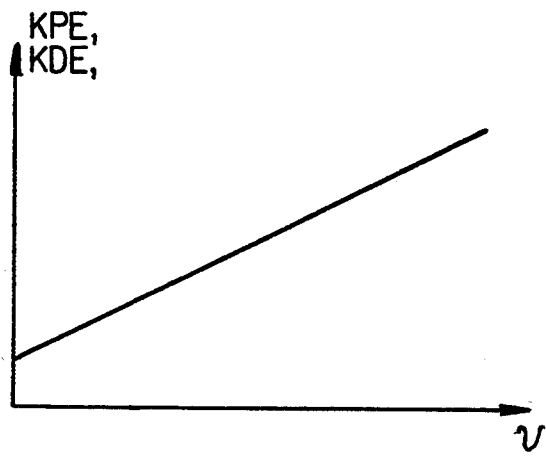
FIG. 8 is a graph of the consideration of the speed dependency of the parameters KPE, KDE, a and b.
Figure 9:
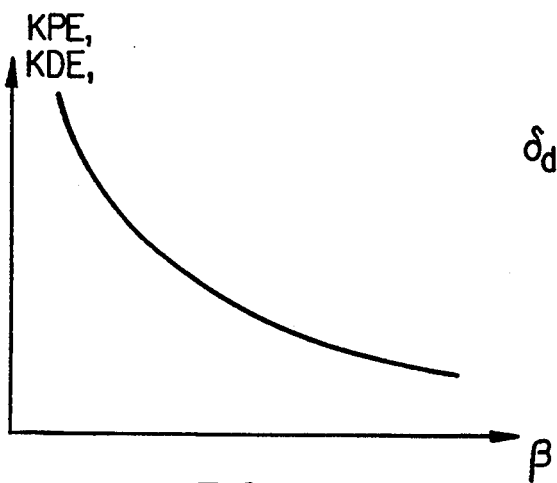
FIG. 9 is a graph of the consideration of the coefficient of friction dependency of the parameters KPE, KDE, a and b.

In the embodiment under discussion, in the case of an instability increase, a correspondingly faster increase or a correspondingly greater variation in the desired slip $\sigma_{des}$ takes place. The variables MULT and DIFF determined in accordance with FIGS. 2 and 3 are evaluated in the computer device 501. A criterion for the variation of the desired slip $\sigma_{des}$ can be derived from this in the computer device 501. For example, a switching-on criterion ESK can be formed, by multiplying the absolute value of the variable MULT by a proportionality constant KPE and by multiplying the variable DIFF by a proportionality constant KDE. The switching-on criterion ESK then results as the sum of the two products and is emitted by the computer device 1 as the output signal 503. An increase or variation of the brake pressure $p_B$ in order to control a desired value of the slip $\sigma_{des}$ takes place as soon as the switching-on criterion ESK exceeds a specific threshold value $ESK_{threshold}$ and ends as soon as the switching-on criterion ESK falls below a specific threshold value $ASK_{threshold}$. The proportionality constants KPE and KDE can advantageously also depend on the vehicle speed v and on the coefficient of friction $\beta$, as shown in FIGS. 8 and 9, respectively.

Figure 6:
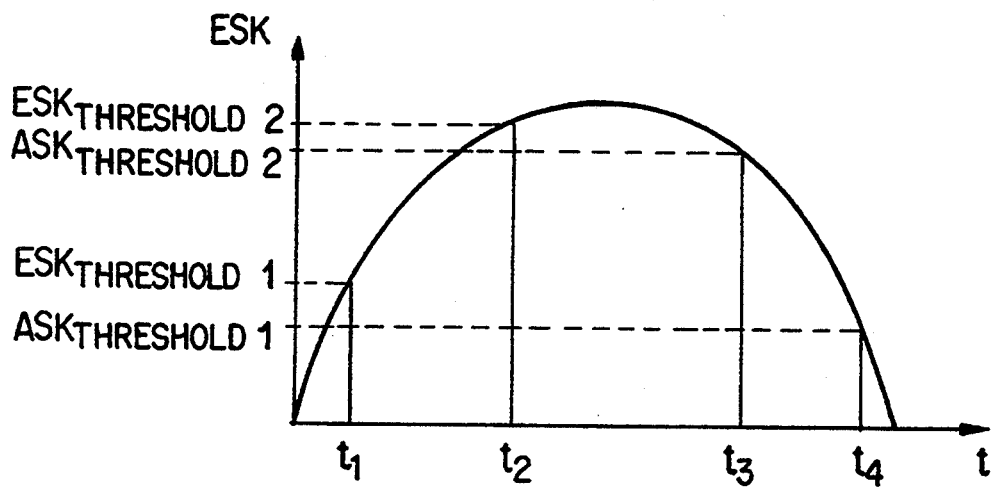
FIG. 6 is a graph of the criteria for use of the method according to the present invention.

A representation of the switching-on criterion ESK in comparison with the associated threshold values $ESK_{threshold}$ and $ASK_{threshold}$ is shown in FIG. 6 in which the criterion ESK is shown with respect to time t. FIG. 6 describes the situation in which the vehicle has not been braked by the vehicle driver, i.e. in which the brake of individual wheels is activated. The relationships in the decrease of the braking force to the individual wheels in order to control a specific desired slip value $\sigma_{des}$ during a braking process then result correspondingly. If the variable ESK exceeds the value $ESK_{threshold1}$ at a time t, one wheel is thus braked initially. If the variable ESK exceeds the value $ESK_{threshold2}$ at time $t_2$, the other wheel of the same axle is additionally braked. In an analogous manner, braking of only one wheel—namely the first wheel to be braked—once again takes place when the variable ESK is less than a value $ASK_{threshold2}$ at time $t_3$. Braking no longer occurs, when the variable ESK is less than a value $ASK_{threshold1}$ at time $t_4$. In addition, the values $ASK_{threshold1}$ and $ASK_{threshold2}$ are less than the respective values $ESK_{threshold1}$ and $ESK_{threshold2}$ in an advantageous manner by such an amount that intervention in the braking does not immediately again take place directly after an end of an intervention in the braking. For example, a value for $ESK_{threshold1}$ can be around 5, and a value for $ASK_{threshold1}$, around 4. Possible values for $ESK_{threshold2}$ and $ASK_{threshold2}$ can be 15 and 12, respectively. The switching-on and switching-off thresholds can also differ, depending on whether understeering (MULT>0) or oversteering (MULT<0) is involved.

Figure 7:
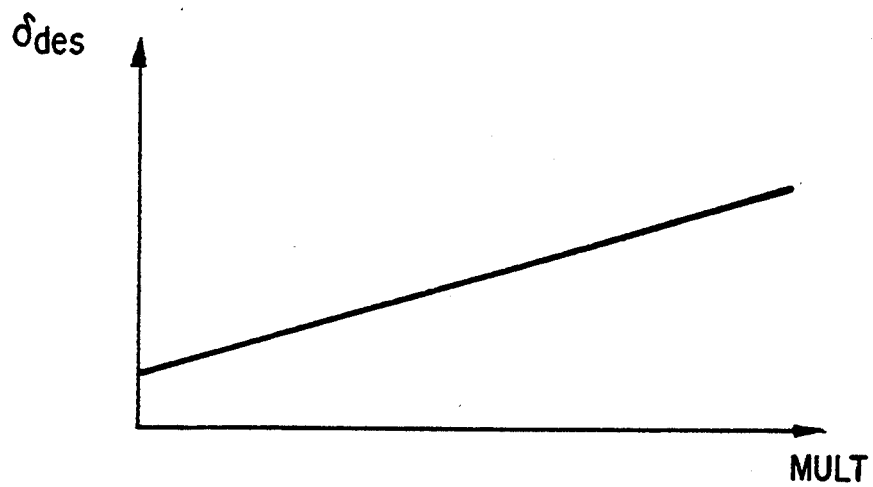
FIG. 7 is a graph of the variation of the desired slip $\sigma_{des}$ from driving situation criteria.

The desired brake slip $\sigma_{des}$ may also vary as a function of the detected driving situation. In accordance with FIG. 7, this variation may take place in accordance with the following equation such that a desired value of the brake slip $\sigma_{des}$ is set:

$$\sigma_{des} = a * MULT + b.$$

In the case of oversteering (MULT<0), the parameter a in the above equation may assume the value 0.13 s/1° and the parameter b the value 0.56. It is possible for $\sigma_{des}$ to be limited to the value of −0.7, in the case of understeering, with a assuming the value 0 and b the value −0.07. The increase, or the variation in the sense of an increase, of the brake pressure $p_B$ to achieve a larger value of the brake slip $\sigma$ takes place, in the case of oversteering, initially on the front wheel on the outside of the turn, and, in the case of understeering, initially on the rear wheel on the inside of the turn. This can be supported by an increase in the brake pressure to achieve a larger brake slip $\sigma$ on the front wheel on the inside of the turn during oversteering and the increase of brake pressure to achieve a larger brake slip $\sigma$ on the rear wheel on the outside of the turn during understeering. This support may take place either immediately, or preferably in accordance with the criteria represented in FIG. 6. If the vehicle is already being braked, the slip threshold value $\sigma_{des}$ is superimposed on the brake slip which has been set as a result of the braking process, in accordance with FIG. 7.

FIG. 8 shows an embodiment of the present invention in which the variables KPE and KDE vary with the vehicle speed v. The corresponding variables then assume the following values at the vehicle speed v=0 km/h: KPE=0.5s/1°, KDE=0.05s²/1° and, at the vehicle speed v=100 km/h: KPE=1.0s/1°, KDE=0.1s/1°. These values apply for an assumed coefficient of friction $\beta$ of 1. In this way, account is taken of the fact that unstable driving situations can be favored with increasing vehicle speed.

FIG. 9 shows another embodiment in which the factors KPE and KDE vary with the coefficient of friction $\beta$. This change appears such that the factors KPE and KDE decrease as the coefficient of friction $\beta$ increases. It is thus possible for there to be a greater decrease in the factors KPE and KDE in the region of lower coefficients of friction $\beta$ than in the region of higher coefficients of friction $\beta$. Orders of magnitude for the factors KPE and KDE then result in accordance with the following table:

| v (km/h) | $\beta$ | KPE (s/1°) | KDE (s²/1°) |
| --- | --- | --- | --- |
| 0 | 1 | 0.5 | 0.05 |
| 100 | 1 | 1.0 | 0.1 |
| 0 | 0.3 | 1.0 | 0.1 |
| 100 | 0.3 | 2.0 | 0.2 |

Consequently, account is taken of the fact that unstable driving situations can be favored with decreasing coefficients of friction.

Figure 10:
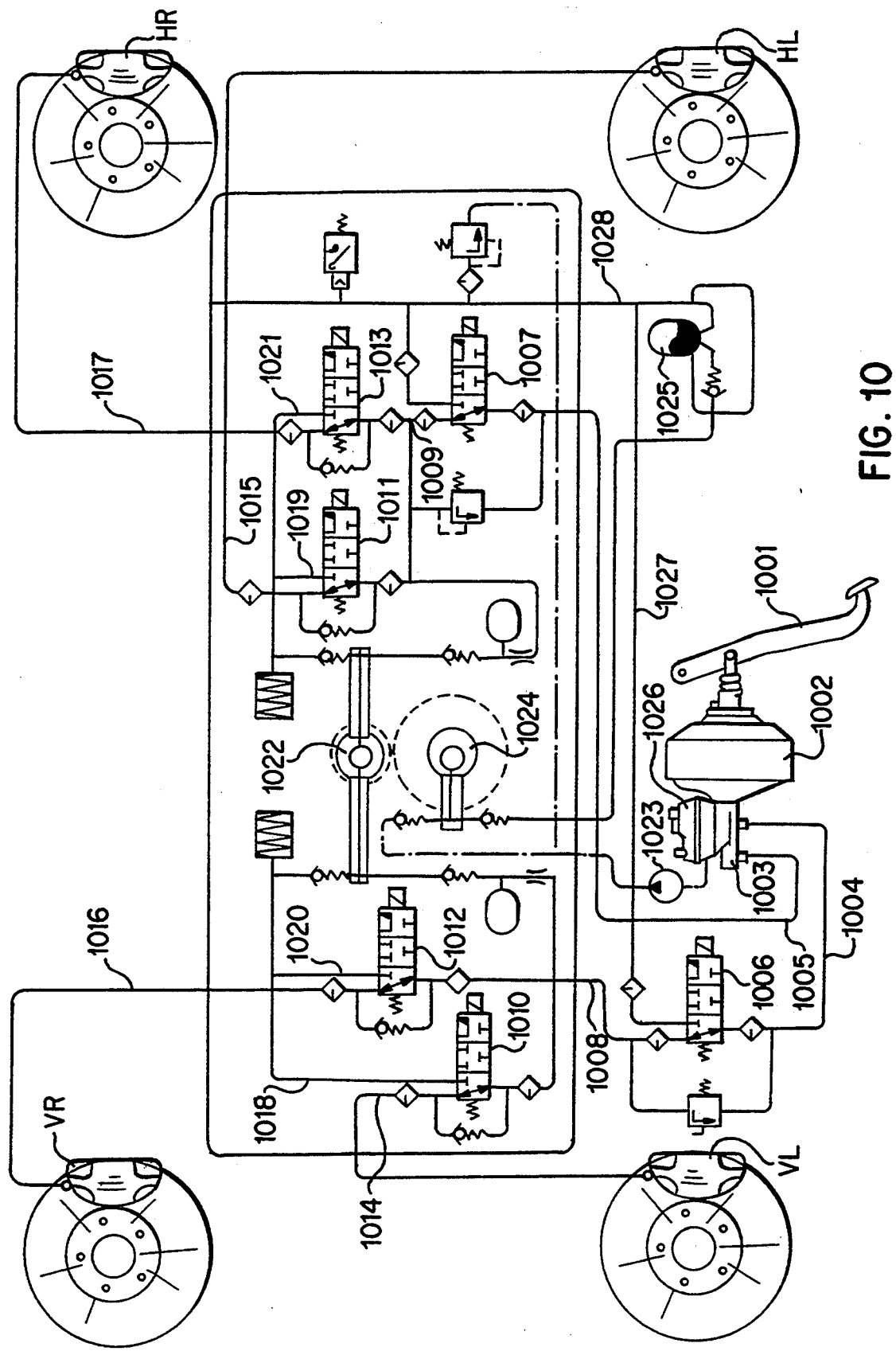
FIG. 10 is a schematic of one embodiment of a device for carrying out the method of the present invention.

FIG. 10 shows an embodiment of a hydraulic circuit of a braking system, using 3/3 valves along with the following description of the hydraulic circuit for the front wheels only inasmuch as the rear wheel hydraulic circuit is substantially similar. The equivalent corresponding components of the hydraulic circuit of the rear wheels are thus specified in brackets. A brake pedal 1001 with an associated braking force amplifier 1002 is connected to a main brake cylinder 1003 and the braking fluid. When the brake pedal is operated by the vehicle driver, because of the increase in pressure, braking fluid flows through the line 1004 (1005) and the valve 1006 (1007) which is connected such that the line 1004 (1005) is connected to the line 1008 (1009). Subject to the valves 1010, 1012 (1011, 1013) being connected such that the line 1008 (1009) is connected to the lines 1014, 1016 (1015, 1017), a pressure increase in the wheel brake cylinders results. When the operation of the brake pedal is ended, the braking fluid thus flows on the reverse path again back into the main brake cylinder 1003. This function corresponds to a normal braking process.

If, for example, the left front wheel VL (HL) is now intended to be braked, without the vehicle driver operating the brake pedal, the components of the hydraulic circuit are driven as follows. Braking fluid is pumped by a plurality of pumps 1023, 1024 from a braking fluid reservoir 1026 into a pressure accumulator 1025. The valve 1006 (1007) is positioned such that the line 1027 (1028) is connected to the line 1008 (1009). Consequently, the brake pedal is decoupled and the wheel brake cylinders can be connected to the pressure accumulator 1025, with appropriate connection of the valves. If the valve 1010 (1011) is connected such that the line 1008 (1009) is connected to the line 1014 (1015), there is a pressure increase in the wheel brake cylinder. If the application of pressure to the wheel brake cylinder takes place as just described from the pressure accumulator 1025, the pressure decrease takes place in an analogous manner to a braking process controlled by an anti-lock braking system (ABS). The valve 1010 (1011) can be connected into a "pressure hold" position, which results in the line 1014 (1015) having no connection to other lines, i.e. the pressure to the wheel remains constant. In a third position, the valve 1010 (1011) can be connected such that the line 1014 (1015) is connected to the line 1018 (1019). The braking fluid is then conveyed back into the line 1008 (1009), by operation of the return pump 1022. In the corresponding position of the valve 1006 (1007), the braking fluid is then conveyed back into the accumulator 1025 again. The brake pressure in the line 1014 (1015) falls, and the brake slip decreases.

Figure 11:
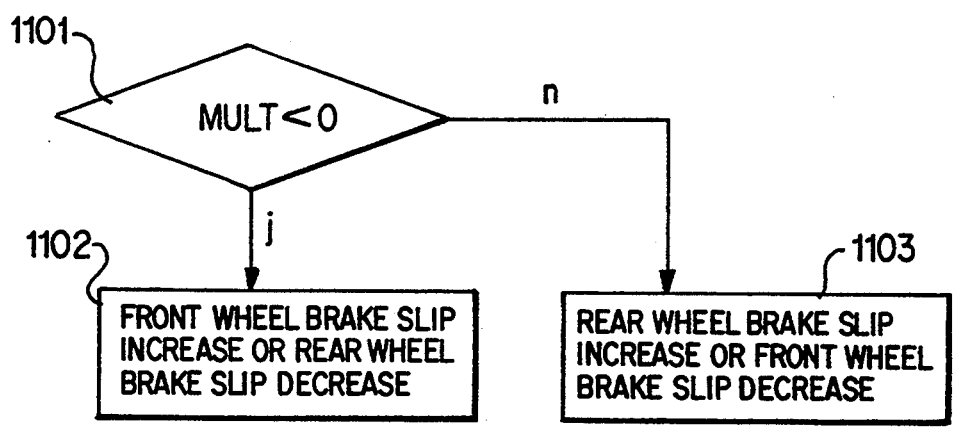
FIG. 11 shows a flow diagram of the method according to the present invention.

As FIG. 11 shows, oversteering or understeering is determined with evaluation of the variable MULT in step 1101 to the effect that step 1101 checks whether the variable MULT is less than 0 (oversteering handling) or whether the variable MULT is greater than 0 (understeering handling). In the case of oversteering handling, the brake slip of the front wheel on the outside of the turn is increased or the brake slip of the rear wheel on the inside of the curve is decreased, in accordance with step 1102. In the case of understeering handling, the brake slip of the rear wheel on the inside of the turn is increased or the brake slip of the front wheel on the outside of the turn is decreased, in accordance with step 1103.

Figure 12:
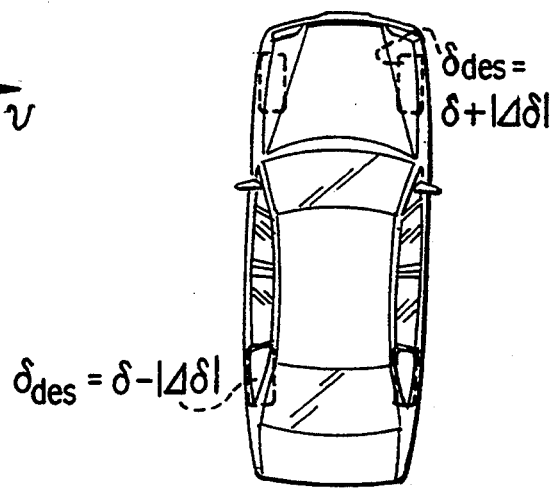
FIG. 12 is a plan view of a vehicle with a representation of brake slip decrease instead of a brake slip increase.

In order in this case further to favor the desired yaw reaction in accordance with the representation in FIG. 12, the brake pressure to individual wheels is increased and brake pressure to individual wheels is additionally decreased. The relationships are in this case analogous to the representation in FIG. 12. The decrease in the brake pressure $p_{Bab}$ can take place at the wheel which is diagonally opposite the wheel at which, in the example of FIG. 12, an increase in the brake pressure $p_{Bauf}$ takes place. The magnitude of the decrease in the brake pressure can be such that a decrease in the brake slip takes place as a reversal of the relationships in the representation according to FIG. 7, i.e. the desired value of the brake slip $\sigma_{des}$ decreases linearly with the variable MULT. Accordingly, the parameters a and b of the above-mentioned equation are:

$$a = -0.004s/1° \text{ and } b = -0.04.$$

Thus, this means that the brake slip on the rear wheel on the inside of the turn is decreased, in the case of oversteering, and the brake slip on the front wheel on the outside of the turn in the case of understeering. In this situation as well, the brake slip on the rear wheel on the outside of the turn can also be decreased for support during oversteering, and the brake slip on the front wheel on the inside of the turn can be decreased during understeering.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for preventing instabilities in handling of a vehicle, comprising the steps of
   (a) forming a desired value of vehicle yaw angle rate $\mu_{des}$ in a computer unit from measured values,
   (b) supplying to the computer unit at least one sensor signal to form an actual value of the vehicle yaw angle rate $\mu_{act}$,
   (c) determining the difference between the desired value of the yaw angle rate $\mu_{des}$ and the actual value of the yaw angle rate $\mu_{act}$ in the computer unit,
   (d) forming a time derivative of said difference in the computer unit,
   (e) generating at least one output signal in the computer unit from said difference and as a function of said time derivative, said output signal being representative of a detected driving situation with respect to yaw behavior of the vehicle as to whether the vehicle has oversteering handling or understeering handling, and
   (f) varying brake slip of individual wheels of the vehicle as a function of this output signal, such that, in the case of oversteering handling, the brake slip is increased for a front wheel of the vehicle on an outside of a turn, and, in the case of understeering handling, the brake slip is increased for a rear wheel of the vehicle on an inside of a turn.

2. The method according to claim 1, wherein, in the case of oversteering handling, the brake slip is additionally increased for a front wheel vehicle on an inside of a turn, and, in the case of understeering handling, the brake slip is additionally increased for a rear wheel of the vehicle on an outside of a turn.

3. A method for preventing instabilities in handling of a vehicle, comprising the steps of
   (a) forming a desired value of the vehicle yaw angle rate $\mu_{des}$ in a computer unit from measured values,
   (b) supplying at least one sensor signal to the computer unit to form an actual value of the vehicle yaw angle rate $\mu_{act}$,
   (c) determining the difference between the desired value of the yaw angle rate $\mu_{des}$ and the actual value of the yaw angle rate $\mu_{act}$ in the computer unit,
   (d) forming a time derivative of said difference in the computer unit,
   (e) generating at least one output signal in the computer unit from said difference and as a function of said time derivative, said at least one output signal being representative of a detected driving situation with respect to yaw behavior of the vehicle as to whether the vehicle has oversteering handling or understeering handling, and
   (f) varying brake slip of individual wheels of the vehicle as a function of said output signal, such that during a braking process in a situation involving oversteering, the brake slip is decreased for a rear wheel of the vehicle on an inside of a turn, and in a situation involving understeering, the brake slip is decreased for a front wheel of the vehicle on an outside of a turn.

4. The method according to claim 2, wherein during a braking process in the oversteering handling case, the brake slip is decreased for a rear wheel of the vehicle on the inside of the turn when the front wheels of the vehicle reach a slip threshold value, and during a braking process in the understeering handling case, the brake slip is decreased for the front wheel of the vehicle on the outside of the turn when the rear wheels of the vehicle reach a slip threshold value.

5. The method according to claim 4, wherein the slip threshold value is the slip threshold of the anti-lock braking system.

6. The method according to claim 3, wherein during a braking process in the oversteering handling case, the brake slip is additionally decreased for the rear wheel on the outside of the turn, and, during a braking process in understeering handling case, the brake slip is additionally decreased for the front wheel on the inside of the turn.

7. The method according to claim 4, wherein during a braking process in the oversteering handling case, the brake slip is additionally decreased for the rear wheel on the outside of the turn, and, during a braking process in understeering handling case, the brake slip is additionally decreased for the front wheel on the inside of the turn.

8. The method according to claim 1, wherein a variable MULT is determined in the computer unit, multiplying said difference by a mathematical sign of the yaw angle rate $\mu_{act}$, such that said generated output signal is representative of understeering handling of the vehicle when said variable MULT is greater than zero and of oversteering handling of the vehicle when the variable MULT is less than zero, and a variable DIFF is determined in the computer unit by multiplying said time derivative of said difference by the mathematical sign of the yaw angle rate $\mu_{act}$ and by the mathematical sign of the variable MULT, such that said generated output signal 7 is representative of an instability increase when the variable DIFF is greater than zero and of an instability decrease when the variable DIFF is less than zero.

9. The method according to claim 6, wherein, in the case of oversteering handling, the brake slip is additionally increased for a front wheel vehicle on an inside of a turn, as a function of the handling of the vehicle and, in the case of understeering handling, the brake slip is additionally increased for a rear wheel of the vehicle on an outside of a turn, as a function of the handling of the vehicle.

10. The method according to claim 3, wherein a variable MULT is determined in the computer unit, multiplying said difference by the mathematical sign of the yaw angle rate $\mu_{act}$, such that said generated output signal is representative of understeering handling of the vehicle when said variable MULT is greater than zero and of oversteering handling of the vehicle when the variable MULT is less than zero, and a variable DIFF is determined in the computer unit by multiplying said time derivative of said difference by the mathematical sign of the yaw angle rate $\mu_{act}$ and by the mathematical sign of the variable MULT, such that said generated output signal 7 is representative of an instability increase when the variable DIFF is greater than zero and of an instability decrease when the variable DIFF is less than zero.

11. The method according to claim 4, wherein a variable MULT is determined in the computer unit, multiplying said difference by the mathematical sign of the yaw angle rate $\mu_{act}$, such that said generated output signal is representative of understeering handling of the vehicle when said variable MULT is greater than zero and of oversteering handling of the vehicle when the variable MULT is less than zero, and a variable DIFF is determined in the computer unit by multiplying said time derivative of said difference by the mathematical sign of the yaw angle rate $\mu_{act}$ and by the mathematical sign of the variable MULT, such that said generated output signal 7 is representative of an instability increase when the variable DIFF is greater than zero and of an instability decrease when the variable DIFF is less than zero.

12. The method according to claim 11, wherein during a braking process in the oversteering handling case, the brake slip is additionally decreased for the rear wheel on the outside of the turn, and, during a braking process in understeering handling case, the brake slip is additionally decreased for the front wheel on the inside of the turn.

13. The method according to claim 8, wherein the increase or decrease in the brake slip takes place by such an amount that a slip difference is set as a function of the variable MULT.

14. The method according to claim 13, wherein a switching-on criterion ESK is formed to constitute the output signal, and monitoring occurs as a function of the variables MULT and DIFF to determine whether said criterion ESK exceeds a limit value.

15. The method according to claim 14, wherein, in the case of oversteering handling, the brake slip is additionally increased for a front wheel vehicle on an inside of a turn, and, in the case of understeering handling, the brake slip is additionally increased for a rear wheel of the vehicle on an outside of a turn.

16. The method according to claim 10, wherein the increase or decrease in the brake slip takes place by such an amount that a slip difference is set as a function of the variable MULT.

17. The method according to claim 16, wherein a criterion ESK is formed to constitute the output signal, and monitoring occurs as a function of the variables MULT and DIFF to determine whether said criterion ESK exceeds a limit value.

18. An apparatus for preventing instabilities in the handling of a vehicle, comprising a computer unit is configured such that a desired value of the vehicle yaw angle rate $\mu_{des}$ is formed from measured values, means for supplying at least one sensor signal to the computer unit from which the actual value of the vehicle yaw angle rate $\mu_{act}$ is formed, wherein the computer unit forms the difference between the desired value of the yaw angle rate $\mu_{des}$ and the actual value of the yaw angle rate $\mu_{act}$, forms a time derivative of said difference and generates at least one output signal from said difference and as a function of said time derivative, said output signal containing information on whether the vehicle has oversteering or understeering handling, and means for varying brake slip of individual wheels of the vehicle as a function of said output signal, wherein in a case of oversteering handling, the brake slip is increased for a front wheel of the vehicle on an outside of a turn, and in a case of understeering handling, the brake slip is increased for a rear wheel of the vehicle on an inside of a turn.

19. The apparatus according to claim 18, wherein said means for varying brake slip is configured such that in the case of oversteering handling, the brake slip is additionally increased for a front wheel vehicle on the inside of a turn, as a function of handling of the vehicle and, in the case of understeering handling, the brake slip is additionally increased for a rear wheel of the vehicle on the outside of the turn, as a function of the handling of the vehicle.

* * * * *